(12) United States Patent
Rock, Jr. et al.

(10) Patent No.: US 7,475,026 B2
(45) Date of Patent: Jan. 6, 2009

(54) METHOD FOR INFORMATION HANDLING SYSTEM CONSUMABLES AUTOMATED ORDERING

(75) Inventors: David Rock, Jr., Round Rock, TX (US); William Wilson, Austin, TX (US)

(73) Assignee: Dell Products L.P., Round Rock, TX (US)

(*) Notice: Subject to any disclaimer, the term of this patent is extended or adjusted under 35 U.S.C. 154(b) by 1016 days.

(21) Appl. No.: 10/314,038

(22) Filed: Dec. 6, 2002

(65) Prior Publication Data

US 2004/0111326 A1 Jun. 10, 2004

(51) Int. Cl.
G06Q 30/00 (2006.01)

(52) U.S. Cl. .................................................. 705/26

(58) Field of Classification Search ................ 705/26, 705/27
See application file for complete search history.

(56) References Cited

U.S. PATENT DOCUMENTS

| | | | |
|---|---|---|---|
| 5,305,199 A | 4/1994 | LoBiondo et al. | 364/403 |
| 5,815,657 A | 9/1998 | Williams et al. | 395/186 |
| 5,930,553 A * | 7/1999 | Hirst et al. | 399/8 |
| 6,295,423 B1 | 9/2001 | Haines et al. | 399/24 |
| 6,356,874 B1 | 3/2002 | Øhrn | 705/6 |
| 6,418,555 B2 | 7/2002 | Mohammed | 717/169 |
| 6,431,704 B1 | 8/2002 | Silverbrook | 347/104 |
| 6,853,978 B2 * | 2/2005 | Forth et al. | 705/26 |
| 6,937,999 B1 * | 8/2005 | Haines et al. | 705/26 |
| 6,985,877 B1 * | 1/2006 | Hayward et al. | 705/27 |
| 7,010,502 B1 * | 3/2006 | Hoshizawa et al. | 705/26 |
| 7,031,933 B2 * | 4/2006 | Harper | 705/26 |
| 2002/0042747 A1 * | 4/2002 | Istvan | 705/26 |
| 2002/0059106 A1 * | 5/2002 | Tani | 705/26 |
| 2002/0073148 A1 | 6/2002 | Haines et al. | 709/204 |
| 2002/0108439 A1 | 8/2002 | Whitehead | 73/290 |
| 2002/0118243 A1 | 8/2002 | Forman | 347/19 |
| 2004/0111326 A1 | 6/2004 | Rock, Jr. et al. | 705/26 |
| 2004/0192301 A1 * | 9/2004 | Shi | 455/435.1 |

FOREIGN PATENT DOCUMENTS

| | | |
|---|---|---|
| EP | 0685768 A1 | 6/1995 |
| EP | 0843229 A2 | 5/1998 |
| EP | 108544 A1 | 9/2000 |
| FR | 2 793 443 | 5/1999 |
| GB | 2 371 129 | 7/2002 |
| GB | 2 373 351 | 8/2002 |
| JP | 2000-194767 | 7/2000 |

OTHER PUBLICATIONS

No Author "Color management making strides", Graphic Arts Monthly, v 75, n 3, p. 42, Mar. 2003. Retrieved from Dialog File: 9, Acc#: 02992510.*

* cited by examiner

*Primary Examiner*—Naeem Haq
(74) *Attorney, Agent, or Firm*—Hamilton & Terrile, LLP; Robert W. Holland

(57) ABSTRACT

An automated consumable ordering system and method obtains an information handling system purchaser's preferences for ordering consumables used by devices of an information handling system ordered for manufacture and loads the consumable ordering preferences on a consumable ordering module of the information handling system during manufacture. Consumable usage by the information handling system is tracked to a predetermined level at which the module orders consumables automatically from the manufacturer. The order is placed with a message that uses a service tag number associated with the information handling system. The manufacturer determines account information for charging the order from the service tag. The module updates account information by directing the user of the information handling system to perform updates through a secure Internet connection with the manufacturer or other secure established connection.

9 Claims, 2 Drawing Sheets

METHOD FOR INFORMATION HANDLING SYSTEM CONSUMABLES AUTOMATED ORDERING

BACKGROUND OF THE INVENTION

1. Field of the Invention

The present invention relates in general to the field of information handling system consumables, and more particularly to a method and system for automated ordering of information handling system consumables.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often operate with incorporated and peripheral devices that use consumable items. For instance, printers print information from information handling systems on consumable paper by using consumable ink. As another example, storage disk drives store information on consumable storage disks, such as floppy and compact disks. Information handling system users typically must replenish consumable item inventories as the consumable items are used by information handling system devices. For instance, information handling system users typically make periodic purchases of consumable items such as printer ink, paper and storage disks. If a user fails to purchase consumable items before the user's inventory is depleted, the information handling system typically loses the functionality associated with the consumable item until the user replenishes the consumable item inventory.

One difficulty with the use of information handling systems is that a number of various consumables are typically used by different devices so that an information handling system user has difficulty tracking consumable inventory and maintaining sufficient inventory to avoid depletion of a given consumable. For instance, an ink jet printer may use one of several types of ink jet cartridges depending on the printer model and the frequency of different types of print jobs, such as color versus black and white printing. If the user fails to purchase extra ink jet cartridges, then the printer becomes essentially useless once the installed cartridges are depleted. Even if the user remembers to purchase additional ink jet cartridges before the on-hand inventory is depleted, the user must find a source to purchase the proper model of ink jet cartridge. For an information handling system user, this means one or more trips to one or more different stores to restock consumable inventories as the inventories are depleted. Failure to purchase consumables in a timely manner or failure to purchase correct consumables may render an information handling system functionally unusable.

SUMMARY OF THE INVENTION

Therefore a need has arisen for a method and system which automatically orders information handling system consumables before the inventory for the consumables is depleted.

A further need exists for a method and system which orders consumables from a single source with reduced risk of ordering of incorrect consumables and reduced risk of improper disclosure of payment information for the consumables.

In accordance with the present invention, a method and system are provided which substantially reduce the disadvantages and problems associated with previous methods and systems for purchasing information handling system consumables. A module installed on an information handling system automatically orders consumables at predetermined inventory levels for consumable-using devices associated with the information handling system.

More specifically, when a purchaser orders an information handling system from a manufacturer, a consumable preference set-up module accepts purchaser preferences for ordering consumables used by devices of the information handling system. The purchaser preferences are incorporated in a consumable auto-order module of the manufactured information handling system along with a service tag number that identifies the purchased information handling system. The information handling system is shipped to the purchaser and consumable usage of consumable-using devices is tracked by a consumable-usage tracking module. Once consumable usage depletes consumable inventory below a predetermined level for consumables identified by the purchaser's consumable preferences, the consumable auto-order module sends an order for additional consumables to the manufacturer with the information handling system service tag number. A consumable order module at the manufacturer associates the service tag number with an account number and arranges to send the ordered consumables to an account address associated with the service tag number. The consumable auto-order module then updates the consumable inventory for the ordered consumables and tracks consumable use for the updated inventory level.

The present invention provides a number of important technical advantages. One example of an important technical advantage is that consumables are ordered automatically for an information handling system without a need for intervention by a user. Consumable usage is automatically tracked and monitored for a predetermined inventory level so that additional consumables are ordered and delivered before depletion of an on-hand inventory. Automatic ordering of consumables ensures that the information handling system user will receive replenishments of consumables before losing system functionality without having to track consumable usage or inventory. Further, automated tracking of consumable usage ensures that ordered consumables match the consumables used by information handling system consumable-using devices.

Another example of an important technical advantage of the present invention is that consumables are automatically ordered based on a purchased information handling system configuration without sending personal account payment information over public networks. For instance, upon purchase of an information handling system, the purchaser inputs consumable order preferences that determine the type of consumables ordered and the account information for payment of the consumables. Once the information handling system is delivered to the purchaser, a module installed during manufacture of the information handling system orders consumables by reference to a service tag number, thus limiting the need for sending of payment information for the ordered consumables.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Automated ordering of information handling system consumables improves usability by ensuring that consumables are re-stocked without user intervention before a lack of a consumable makes an information handling system function or device unusable. The present invention provides effective automatic tracking and ordering of consumables by including consumable ordering preferences during manufacture of an information handling system. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
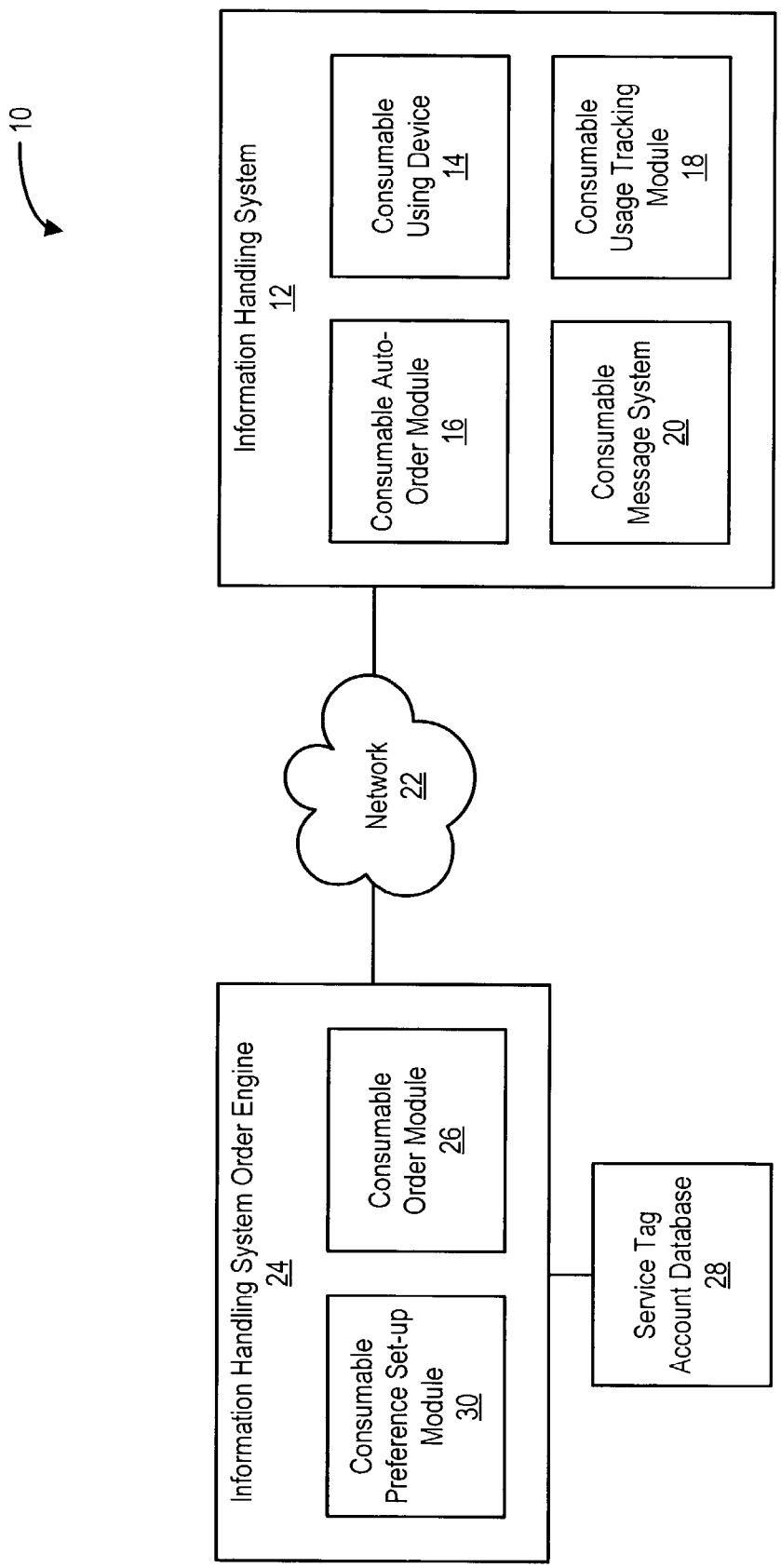
FIG. 1 depicts a block diagram of an automatic consumable ordering system for information handling system consumables.

Referring now to FIG. 1, a block diagram depicts an automatic consumable ordering system 10 for consumables used by an information handling system 12. Information handling system 12 is manufactured with one or more consumable-using devices 14. For instance, in one embodiment, consumable-using device 14 is an ink jet printer that uses consumable ink jet cartridges and ink jet paper, such as for printing color pictures. Alternatively, consumable-using device 14 is a laser printer that uses consumable laser printer toner cartridges and drums and regular printing paper. In another embodiment, consumable-using device 14 is a disk storage device that stores information on consumable media, such as disks used by CD-ROM, CD-RW or DVD compact disks drives, floppy disks or storage tapes for ZIP drives.

A consumable auto-order module 16 is loaded on information handling system 12 automatically places orders for consumables used by consumable-using device 14. Consumable auto-order module 16 compares desired levels of consumable inventory established from consumable preferences with actual levels of consumable inventory determined by a consumable usage tracking module 18. When a consumable inventory level reaches a predetermined level, consumable auto-order module 16 places an order for that consumable through a consumable message 20. For instance, for a printer consumable-using device 14, consumable auto-order module 16 sets an order threshold for ink and places an order for additional ink based on ink levels measured by the printer. When consumable usage tracking module 18 detects an ink level of the order threshold, consumable auto-order module 16 sends a message to the manufacturer of the information handling system with consumable message system 20 through a network 22, such as the Internet, to order additional printer ink. The message sent by consumer message system 20 identifies the desired consumable and ordering source with a service tag number so that account information, such as a credit card account number, is not sent through insecure communications. A service tag number is typically an alphanumeric identification number that is assigned by the manufacturer.

Orders for consumables are received by an information handling system order engine 24 operated directly or indirectly by the information handling system manufacturer. A consumable order module 26 looks up account information for received consumable orders with a service tag account database 28 by finding the account information associated with the service tag of a consumable order message. Consumable order module 26 places an order for the consumable to be shipped to the site of information handling system 12 by using the account information without any need for intervention by the user or information handling system 12. The use of the service tag to fill the consumable order makes the process anonymous to anyone who intercepts a consumable order message since no personal or payment information is transferred to accomplish the sale. In the event that the user of information handling system 12 desires direct interaction with the consumable ordering process, consumer auto-order module 16 directs communication with a consumable preference set-up module through a secure interface, such as a secure Internet interface with a browser of information handling system 12. For instance, the user is able to update account information through consumable preference set-up module 30 so that subsequent messages with the service tag will place consumable orders according to the updated account information.

Figure 2:
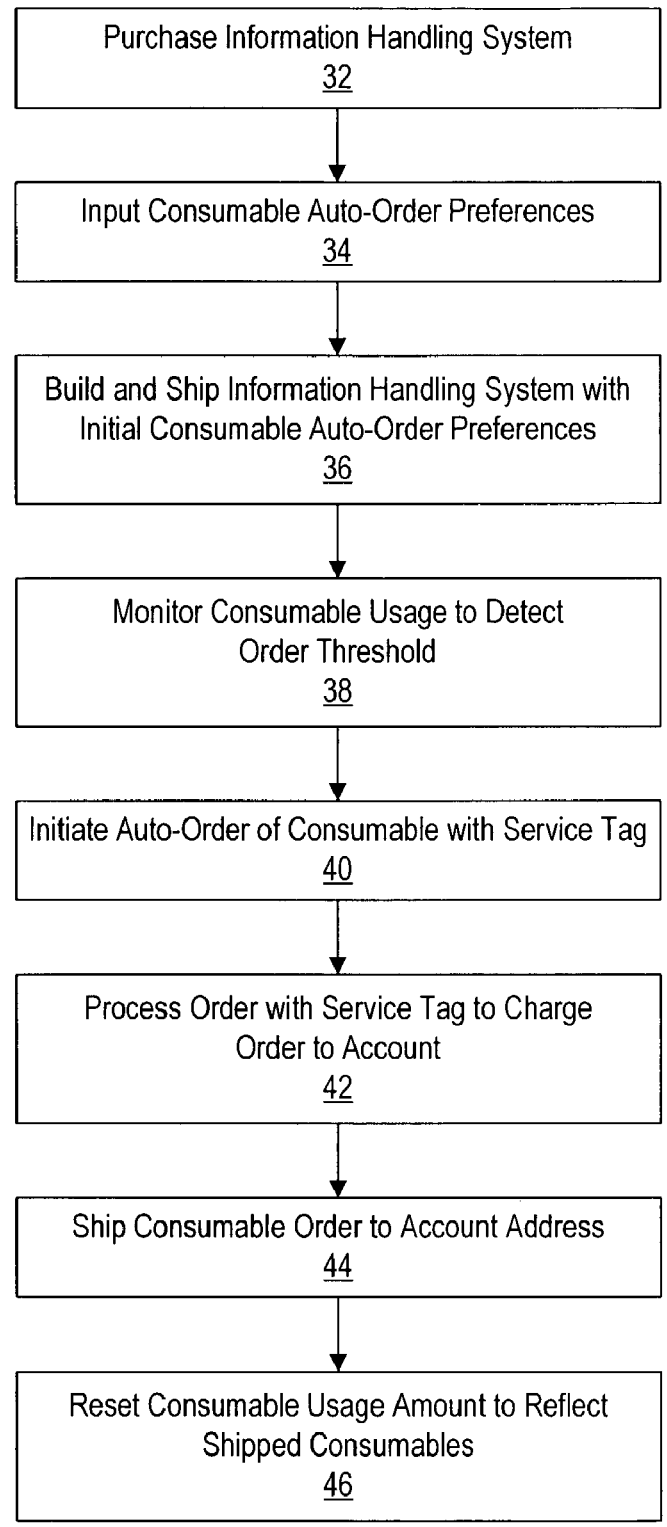
FIG. 2 depicts a flow diagram of a process for automated ordering of consumables used by an information handling system.

Referring now to FIG. 2, a flow diagram depicts a process for using consumable preference set-up module 30 to establish consumable preferences when an information handling system is ordered from a manufacturer. The process starts at step 32 with the ordering of an information handling system from a manufacturer, such as through a secure Internet interface. At step 34, during the ordering of the information handling system, the purchaser inputs consumable auto-order preferences so that an auto order module is installed with the preferences during manufacture of the information handling system. For instance, consumable preference set-up module 30 determines the consumable-using devices purchased with the information handling system and the type of consumable goods the user may need. Consumable preference set-up module 30 then queries the purchaser to determine if auto-ordering of consumables is desired for one or more of the consumable-using devices. The account information for purchasing the consumables with auto-orders may be copied from the purchase of the information handling system or separately input by the purchaser. At step 36, the information handling system is built to include a consumable auto-order module populated with the initial consumable auto-order preferences and is shipped to the purchaser. In an alternative embodiment, consumable auto-order module 16 may query the user for initial consumable order preferences during initial power-up by a purchaser.

At step 38, consumable auto-order module 16 monitors consumable usage to detect consumable inventory levels below an order threshold. When a consumable order threshold is reached, at step 40 an automatic order of the consumable is initiated by sending a message to the manufacturer with the service tag of the information handling system. In one embodiment, the initiation of a consumable order occurs without customer intervention based on automated tracking of consumable usage. In an alternative embodiment, consumable orders are confirmed by the information handling system user before the order is sent to allow the user to alter the order or to order additional items. Alternatively, a confirmatory e-mail may be sent to the information handling system user after the order is automatically sent to and received by the manufacturer.

At step 42, the auto-consumable order is processed by the manufacturer to automatically purchase and send the identified consumable to the information handling system location. For instance, service tag information provided by a consumable auto-order message is correlated with account information to determine a credit card to charge for the order and an address to which the order is to be sent. At step 44, the consumable order is shipped to the account address associated with the service tag number. At step 46, the consumable inventory amount is updated to reflect shipped consumables. For instance, a message is sent to the information handling system associated with the service tag number indicating the shipment of the ordered consumables. Alternatively, the information handling system user is presented with a display query after the lapse of a shipment time to determine that the consumable has arrived, or the consumable-using device is monitored to detect the installation of additional consumables. Once the consumable inventory is updated to reflect the addition of ordered consumables, the process returns to step 38 to monitor consumable usage.

Although the present invention has been described in detail, it should be understood that various changes, substitutions and alterations can be made hereto without departing from the spirit and scope of the invention as defined by the appended claims.

What is claimed is:

1. A method for automatic ordering of consumables used by an information handling system, the method comprising:
   inputting of consumable order preferences by an information handling system purchaser at the time of ordering the information handling system;
   manufacturing the information handling system with a consumable order module that incorporates the purchaser consumable preferences;
   shipping the information handling system from the manufacturer to the purchaser;
   tracking consumable usage associated with the information handling system;
   determining that a consumable order preference is reached with the consumable order module; and
   ordering consumables according to the consumable order preference with a message sent from the information handling system to the information handling system manufacturer.

2. The method of claim 1 wherein inputting consumable order preferences further comprises:
   inputting account information to charge for ordered consumables;
   associating the account information with a service tag of the information handling system;
   storing the account information and associated service tag by the manufacturer of the information handling system; and
   configuring the consumable order module to communicate consumable orders to the manufacturer with the service tag.

3. The method of claim 2 further comprising:
   accepting consumable orders at the manufacturer of the information handling system, the consumable orders having the service tag; and
   determining account information to charge for the consumable order by associating the service tag with the account information.

4. The method of claim 2 further comprising:
   determining that the account information is obsolete; and
   directing the information handling system to contact the manufacturer to update the account information through a secure internet connection.

5. The method of claim 1 further comprising:
   updating the tracking of consumable usage with the ordered consumables.

6. The method of claim 1 wherein the consumables comprise printer ink.

7. The method of claim 1 wherein the consumables comprise printer paper.

8. The method of claim 1 wherein the consumables comprise storage media.

9. The method of claim 1 further comprising:
   presenting a user of the information handling system with the consumable preferences;
   accepting updates of the consumable preferences through the information handling system; and
   tracking the updated consumable preferences with the consumable order module.

* * * * *